(12) United States Patent
Kopansky et al.

(10) Patent No.: US 11,781,896 B2
(45) Date of Patent: Oct. 10, 2023

(54) ELECTRO-OPTIC SENSOR

(71) Applicant: Eaton Intelligent Power Limited, Dublin (IE)

(72) Inventors: Gregory Kopansky, Philadelphia, PA (US); John Joseph Zielinski, Southampton, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/160,240

(22) Filed: Jan. 27, 2021

(65) Prior Publication Data

US 2021/0239508 A1 Aug. 5, 2021

Related U.S. Application Data

(60) Provisional application No. 62/968,653, filed on Jan. 31, 2020.

(51) Int. Cl.
*G01F 23/292* (2006.01)
*G01K 1/02* (2021.01)

(52) U.S. Cl.
CPC ......... *G01F 23/2922* (2013.01); *G01K 1/026* (2013.01)

(58) Field of Classification Search
CPC .................................................. G01F 23/2922
See application file for complete search history.

(56) References Cited

U.S. PATENT DOCUMENTS

| | | | |
|---|---|---|---|
| 4,134,022 A * | 1/1979 | Jacobsen | G01F 23/2925 250/577 |
| 4,946,242 A | 8/1990 | Tanno et al. | |
| 5,029,471 A | 7/1991 | Goodrich | |
| 5,279,157 A | 1/1994 | Mattis et al. | |
| 5,765,994 A | 6/1998 | Barbier | |
| 6,661,504 B2 * | 12/2003 | Rakucewicz | G01N 21/431 356/136 |
| 6,681,585 B1 | 1/2004 | Stagg et al. | |
| 8,264,171 B1 | 9/2012 | Domer | |
| 10,222,251 B2 | 3/2019 | Kopansky et al. | |
| 2005/0236591 A1 * | 10/2005 | Wirthlin | G01F 23/2925 250/577 |
| 2010/0025509 A1 * | 2/2010 | Matlin | G01F 23/292 241/25 |
| 2012/0140233 A1 | 6/2012 | Rockwell et al. | |

(Continued)

FOREIGN PATENT DOCUMENTS

| | | | | |
|---|---|---|---|---|
| DE | 35 19 342 A1 | 12/1986 | | |
| DE | 4129719 A | * 3/1992 | | G01F 23/2921 |

OTHER PUBLICATIONS

Extended European Search Report for Application No. 21154154.5 dated Jun. 22, 2021.

(Continued)

*Primary Examiner* — Paul M. West
*Assistant Examiner* — Mark A Shabman
(74) *Attorney, Agent, or Firm* — MERCHANT & GOULD P.C.

(57) ABSTRACT

The present disclosure provides an electro-optic sensor that performs well in a wide range of temperatures. The sensors of the present disclosure can be used in high temperature applications. In some embodiments, the sensor can detect the presence or absence of fluid as well as measure temperature.

21 Claims, 3 Drawing Sheets

(56) References Cited

U.S. PATENT DOCUMENTS

2015/0002023 A1* 1/2015 Imangholi ............... H01L 33/32
                                                                                        315/129
2016/0202108 A1* 7/2016 Kopansky ........... G01F 23/2922
                                                                                        250/576
2019/0128788 A1    5/2019 Gerardi

OTHER PUBLICATIONS

Lau et al., "A low-cost optical sensing device based on paired emitter-detector light emitting diodes," Analytica Chimica Acta, vol. 557, pp. 111-116 (2006).

Office Action issued in corresponding European Patent Application No. 21154154.5, dated Apr. 17,023.

\* cited by examiner

ELECTRO-OPTIC SENSOR

CROSS-REFERENCE TO RELATED APPLICATIONS

This application claims priority to U.S. Provisional Application No. 62/968,653 filed on Jan. 31, 2020, the entire disclosure of which is hereby expressly incorporated herein by reference.

TECHNICAL FIELD

The present disclosure relates to electro-optic sensors that can detect the presence or absence of fluid.

BACKGROUND

Sensors for detecting the presence or absence of fluid and/or temperature have numerous applications. One known sensor type for detecting the presence or absence of fluid is an electro-optic liquid sensor. Electro-optic liquid sensors are described in U.S. Pat. No. 10,222,251 to Kopansky et al., which is herein incorporated by reference in its entirety. Known electro-optic sensors generally do not perform well in high temperature environments. There is a need for improved electro-optic sensors that can perform well in wider ranges of temperatures. There is also a need for electro-optic liquid sensors that also have the capability of measuring temperature.

SUMMARY

The present disclosure provides an electro-optic sensor that performs well in a wide range of temperatures. The fluid sensors of the present disclosure can be used in high temperature applications. In some embodiments, the sensor can detect the presence or absence of fluid as well as measure temperature.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
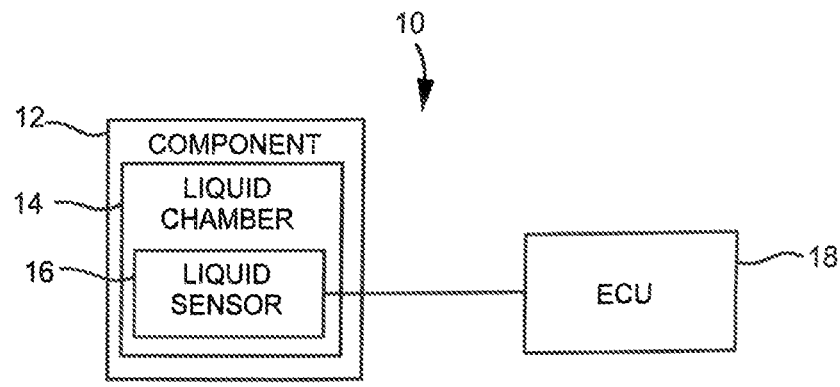
FIG. 1 is a block diagram of an exemplary embodiment of a system including a component for which determining the presence or absence of fluid and/or temperature may be desirable.

Referring to the figures, in which like reference numerals refer to the same or similar features in the various views, FIG. 1 is a block diagram view of a system 10 including a component 12 for which determining the presence or absence of liquid may be desirable. The component 12 may include a liquid chamber 14, and the system 10 may further include a liquid sensor 16 and an electronic control unit (ECU) 18.

The component 12 may be any component in any field that includes or may be exposed to liquid in its operation. For example, the component 12 may be or may be included in a mechanical, electrical, hydraulic, pneumatic, or other known actuator or actuation system. The component 12 may include a liquid chamber 14 configured to store or receive a liquid. The liquid may be, for example only, of a type necessary for the functionality of the component 12 (e.g., hydraulic fluid, liquid for lubrication, fuel, etc.), liquid incidental to the environment of the component 12, and/or liquid that is detrimental to the function of the component 12.

In one embodiment, the component 12 could be, for example, a gearbox that houses gears and high temperature lubricating oil. The gearbox could be a high performance type gearbox in an aerospace application, such as the gearbox of a jet engine. The temperature of the oil in the gearbox could be between 150 to 200° C. It should be appreciated that many alternative applications are possible.

The liquid sensor 16 may be coupled with the component 12. For example, the liquid sensor 16 may be disposed within the liquid chamber 14 of the component 12. The liquid sensor 16 may be an electro-optic sensor according to the present disclosure, such as that described in conjunction with FIGS. 2 and 3. It should be appreciated that alternative embodiments are possible.

The ECU 18 may be electrically coupled to the liquid sensor 16 and may be configured to drive the liquid sensor 16, receive feedback from the liquid sensor 16, assess whether liquid is present or absent in the liquid chamber 14, and/or assess the operational state of the liquid sensor 16. The ECU 18 may comprise, in embodiments, one or more of a processor, a non-volatile computer-readable memory, an application-specific integrated circuit (ASIC), field-programmable gate array (FPGA), and/or other known processing or memory devices. The ECU 18 may be or may comprise a dedicated processing resource for the liquid sensor 16, or may be or may comprise processing resources for numerous sensors, components, and/or systems. The ECU 18 may be electrically coupled to the liquid sensor 16 through known wired and/or wireless connections.

Figure 2:
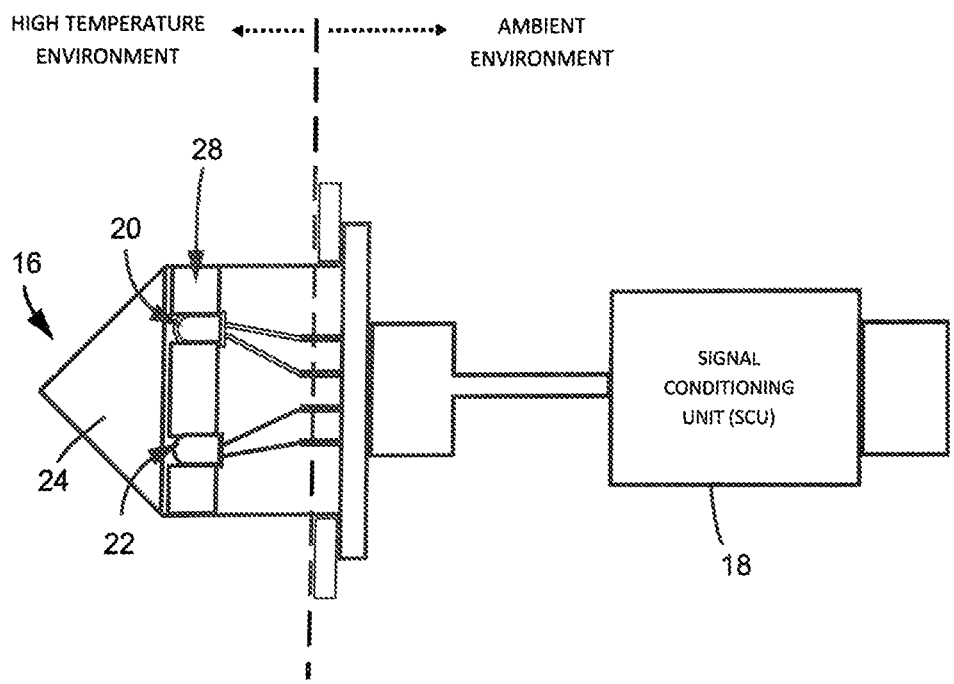
FIG. 2 is a cross-sectional view of an embodiment of the sensor of the present disclosure.

FIG. 2 illustrates a multicomponent system wherein the ECU 18 (also referenced herein as Sensor Signal Conditioning Circuitry) is connected to the liquid sensor 16 via an electrical cable and electrical connector interface. In the depicted embodiment, some of the hardware components including the light emitter, sensor, and temperature sensors are remote from the signal conditioning unit.

Figure 3:
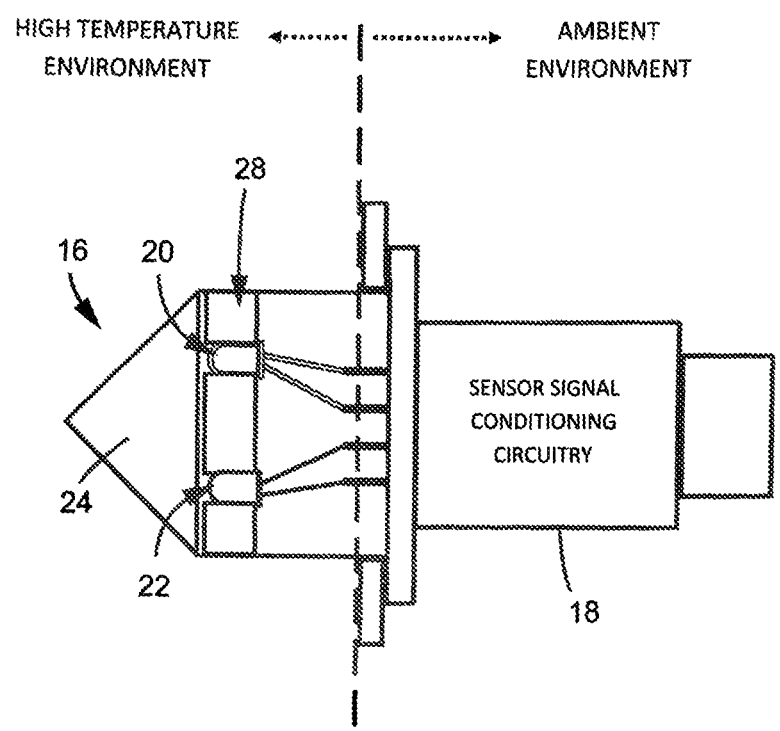
FIG. 3 is a cross-sectional view of an alternative embodiment of the sensor of FIG. 2.

FIG. 3 illustrates an alternative embodiment wherein the ECU/Sensor Signal Conditioning Circuitry 18 is integrated with the hardware components of the liquid sensor 16. FIG. 3 illustrates an embodiment wherein the ECU/Sensor Signal Conditioning Circuitry 18 is directly mounted to the sensor housing.

Figure 4:
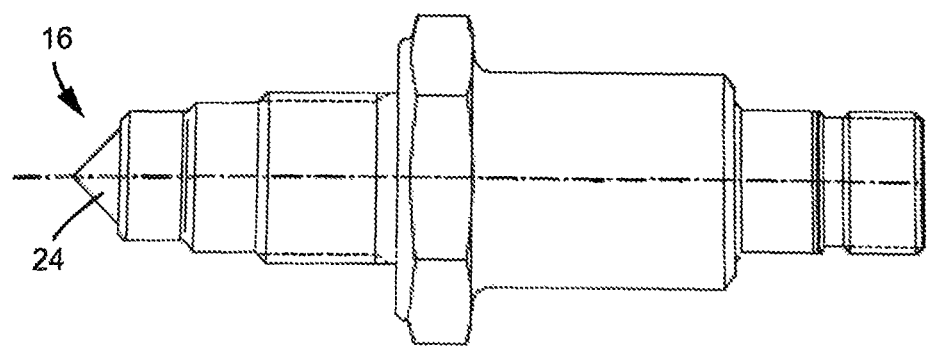
FIG. 4 is a side elevation view of a sensor according the present disclosure.

FIG. 4 depicts an example physical housing of the integrated sensor of FIG. 3. In the depicted embodiment, the sensor can be mounted via a single aperture into a tank and provide both fluid presence sensing and temperature sensing. It should be appreciated that alternative embodiments are possible.

In addition to assessing the data from the liquid sensor 16 to determine whether liquid is present or absent at the liquid sensor 16, the ECU 18 can be configured to ascertain the temperature at the liquid sensor 16.

The liquid sensor 16 may include a light source 20, a light detector 22, a prism 24, and a reflective optical member (which may also be referred to as an optical shield), which may be generally disposed within a housing 28. Reflective optical members are shown and described in further detail in U.S. Pat. No. 10,222,251 to Kopansky et al., which is incorporated by reference in its entirety.

The light source 20 may be configured to emit light of a chosen frequency and power (or powers) appropriate for a given application (i.e., appropriate for the characteristics of the other elements of the sensor, such as shape, orientation, materials, reflectivity, etc., and/or according to characteristics of the liquid to be detected, such as density, scattering properties, etc.). As used herein, a light frequency should be understood to include either/or both of a specific frequency of light and a frequency band. In an embodiment, the light source 20 may be configured to emit light in the infrared portion and/or the near-infrared portion of the electromagnetic spectrum. The light source 20 may be or may include one or more of a light-emitting diode (LED), a laser, or other known light source, in an embodiment.

The light detector 22 may be configured, in an embodiment, to detect light of one or more frequencies of light, including at least the frequency of light emitted by the light source 20. In the depicted embodiment, the light detector 22 is a LED. The LED is not used to generate light but rather it is used in reverse to detect light. The light detecting LED is configured to generate a voltage or current when it detects light (e.g., when light is shined on the detecting LED). Whether a voltage or current is generated depends on the configuration of the diode arrangement within the system. In one embodiment, the LED diode is an 850 nanometer peak emission Gallium-Aluminum-Arsenide (GaAlAs) type device. It should be appreciated that many alternatives are possible. For example, the LED light emitter and/or LED light detector can alternatively have GaAS or GaInAs construction.

The combination of the paired LED emitter and detector provides a liquid sensor that performs well in high temperature applications. In addition, as discussed above, the LED emitter can be configured to measure temperature as well.

In the depicted embodiment, the LED light detector and the LED light emitter can be two of the same component. Using the same model LED for both the emitter and detector ensures that they are paired. It should be appreciated that the LED can be of different models and brands as well. As discussed above, the LED light detector is paired to the light emitting LED so long as the LED light detector can detect light of the frequency or wavelength that is emitted by the light emitting LED. To decrease susceptibility to ambient light noise, it can be desirable to further match the LED so that the nominal operable wavelength substantially overlaps. For example, in some embodiments, it can be desirable that the emitting LED only emits light in the range that the detecting LED can detect light. This decreases the likelihood that light from another source creates a false reading on the light detecting LED and increases the system's light immunity.

The prism 24 may be a member, article, or device comprising one or more components configured in size, shape, and materials to reflect a light signal from the light source 20 to the light detector 22 in certain conditions, and to pass light from the light source 20 through the prism 24 in certain conditions. For example only, the prism 24 may be configured to reflect light from the light source 20 to the light detector 22 when liquid is not present around the prism 24, and to pass light from the light source 20 through the prism 24 when liquid is present around the prism 24. In an embodiment, for example only, the prism 24 may comprise borosilicate glass, fused silica (quartz), one or more polymers, etc., that is optically-transmissive at least to light of the frequency emitted by the light source 20. Thus, in an embodiment, the prism 24 may be optically-transmissive to light in the infrared and/or near-infrared portions of the electromagnetic spectrum, for example only.

Figure 5:
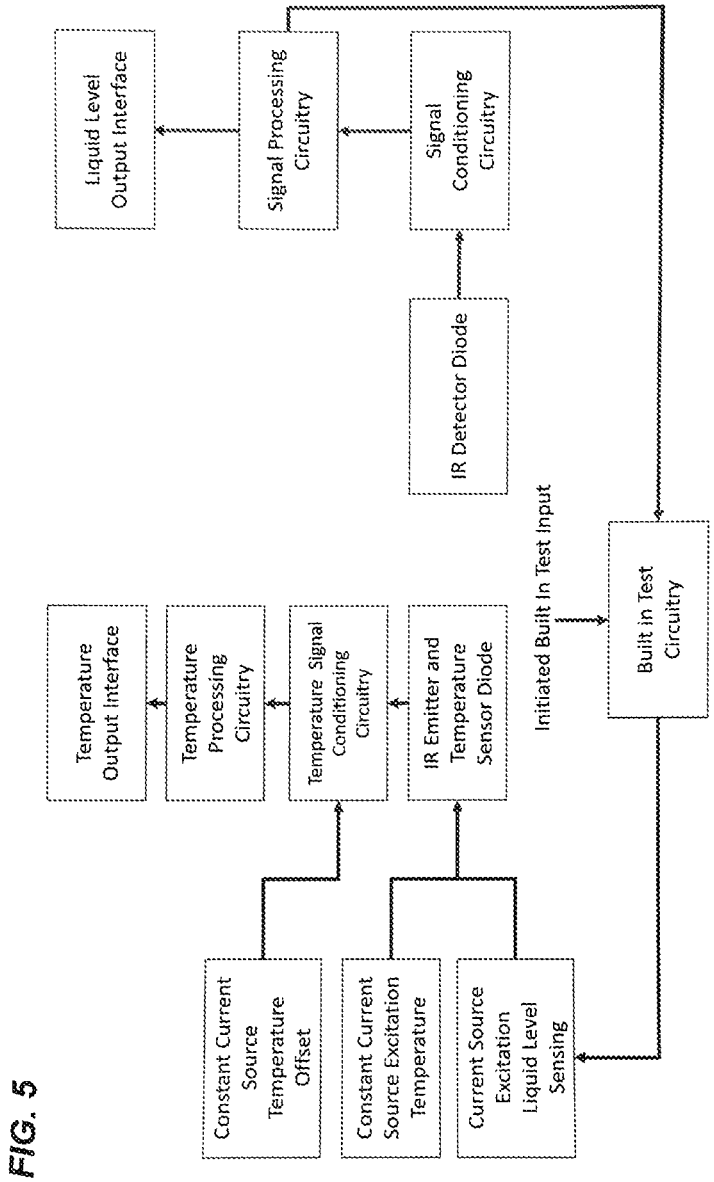
FIG. 5 is a block diagram of an embodiment of the system of the present disclosure.

Referring to FIG. 5, a block diagram of an embodiment of the system of the present disclosure is shown. In the depicted embodiment, the IR emitter and temperature sensor diode (e.g., LED emitter) are operably connected to a constant current source. In the depicted embodiment, the constant current source supplies current to the IR emitter for level sensing and/or temperature sensing functions. The temperature constant current source supplies a small current and offset current sufficient to mitigate component and environmental effects such as diode self-heating. This current could be, for example, within 0.1 to 1 mA range depending on the diode used and application temperature range. The level sensing excitation current source could be, for example, within 1 to 10 mA depending on the particular diode and application.

In the depicted embodiment, the IR emitter and temperature sensor diode (e.g., LED emitter) are operably connected to temperature signal conditioning circuitry. In the depicted embodiment, the temperature signal conditioning circuit converts the signal from the temperature diode to a ° C./V signal mapped to the range of the temperature processing circuit and corrects for environmental offsets. For example, the temperature from −65 to 175° C. could be mapped to 0 to 5V range for processing.

In the depicted embodiment, the temperature signal conditioning circuitry is operably connected to temperature processing circuitry. In the depicted embodiment, the temperature processing circuit converts the signal from the conditioning circuit to the temperature output interface. For example, the processing circuit could provide signal sampling and buffering for a digital serial output.

In the depicted embodiment, the IR detector diode (e.g., LED detector) is operably connected to signal conditioning circuitry. In the depicted embodiment, the signal conditioning circuit converts the raw signal from the IR detector to a format suitable for the signal processing circuit. For example, this circuit could amplify and filter the raw signal for further signal processing.

In the depicted embodiment, the signal conditioning circuit is operably connected to signal processing circuitry. In the depicted embodiment, the signal processing circuitry converts the signal from the signal conditioning circuitry to a discrete liquid level output interface. For example, sampling and buffering the signal for a digital serial output or triggering a digital on/off signal.

In the depicted embodiment, the system includes built-in test circuitry. In the depicted embodiment, the built-in test circuitry includes self-test capabilities to test level and temperature sensing functions.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An electro-optic liquid sensor comprising:
   a housing extending between first and second ends, the housing including a seal flange;
   an LED light emitter disposed within the housing, wherein the LED light emitter is also a temperature sensor;
   an LED light detector disposed within the housing;
   a prism positioned so that the LED light emitter and the LED light detector are positioned between the prism and the seal flange, the prism being configured to reflect light emitted from the LED light emitter to the LED light detector; and
   a current source for supplying current to the LED light emitter for level sensing and temperature sensing functions of a liquid within a tank, wherein the LED light emitter interfaces with circuitry to determine a temperature of the liquid within the tank.

2. The sensor of claim 1, wherein the LED light emitter is configured to generate light of a first range of wavelengths, wherein the LED light detector is configured to generate voltage when the light of the first range of wavelengths is shined on the LED light detector.

3. The sensor of claim 1, wherein the LED light emitter is configured to generate light of a first range of wavelengths, wherein the LED light detector is configured to generate current when the light of the first range of wavelengths is shined on the LED light detector.

4. The sensor of claim 1, wherein the LED light emitter and the LED light detector are LED that share substantially the same overlapping operating wavelength ranges.

5. The sensor of claim 1, wherein the prism is connected to the first end of the housing, wherein the housing is sealed and configured to be at least partially immersed into the tank containing liquid.

6. The sensor of claim 5, further comprising a thermally conductive light blocking chassis located in a first end portion of the housing, wherein the LED light emitter and the LED light detector are secured in the thermally conductive light blocking chassis.

7. The sensor of claim 5, wherein the seal flange is disposed at the second end of the housing, the seal flange being configured to seal an opening in a tank wall into which the first end of the housing extends.

8. The sensor of claim 5, wherein the second end of the housing is configured to mate with an electrical connector.

9. The sensor of claim 1, wherein the tank is a gearbox and the liquid is oil.

10. The sensor of claim 1, wherein the LED light emitter emits infrared or near-infrared light, and wherein the LED light detector detects infrared or near-infrared light.

11. The sensor of claim 1, wherein the LED light emitter emits visible light, and wherein the LED light detector detects visible light.

12. The sensor of claim 1, wherein the LED light emitter emits ultraviolet light, and wherein the LED light detector detects ultraviolet light.

13. The sensor of claim 1, further comprising a reflective optical member, wherein the reflective optical member is arranged to reflect light emitted by the LED light emitter to the LED light detector and the LED light emitter is configured to provide light at a plurality of intensities for assessing an operational state of the sensor.

14. The sensor of claim 1, wherein the LED light emitter and the LED light detector are 850 nanometer peak emission Gallium-Aluminum-Arsenide LED diodes.

15. The sensor of claim 1, wherein the temperature of the liquid is at least 150° C.

16. The sensor of claim 1, wherein the LED light emitter and the LED light detector are paired in terms of wavelength specifications.

17. The sensor of claim 1, wherein the LED light emitter and the LED light detector have the same hardware construction.

18. The sensor of claim 1, wherein the circuitry includes at least one of signal conditioning circuitry or signal processing circuitry.

19. An electro-optic liquid sensor system comprising:
   a sensor including:
      a sealed housing including a first end and a second end, the sealed housing also including a seal flange located at the second end of the sealed housing;
      an LED light emitter secured in the housing between the seal flange and the first end;
      an LED light detector secured in the housing between the seal flange and the first end; and
      a prism connected to the first end of the housing and configured to reflect light emitted from the LED light emitter to the LED light detector;
   an electrical connector connected to the second end of the housing;
   an electrical cable including a first end connected to the electrical connector;
   a signal conditioning unit connected to a second end of the electrical cable; and
   a current source for supplying current to the sensor for level sensing and temperature sensing functions of a liquid within a tank;
   wherein at least one of the LED light emitter or LED light detector is also a temperature sensor, and wherein the LED light emitter or LED light detector interface with circuitry to determine a temperature of the liquid within the tank.

20. The electro-optic liquid sensor system of claim 19, further comprising a thermally conductive light blocking chassis located in a first end portion of the housing, wherein the prism is connected to the first end portion of the housing, wherein the housing is sealed and configured to be at least partially immersed into the tank containing liquid, wherein the LED light emitter and the LED light detector are secured in the thermally conductive light blocking chassis, and wherein the seal flange is disposed at the second end of the housing, the seal flange being configured to seal an opening in a tank wall into which the first end of the housing extends.

21. An electro-optic liquid sensor comprising:
   a housing extending between first and second ends, the housing including a seal flange and being configured to be mounted via a single aperture into a tank;

an LED light emitter disposed within a housing;
an LED light detector disposed within the housing;
a prism, wherein the LED light emitter and the LED light detector are positioned between the prism and the seal flange, the prism being configured to reflect light emitted from the LED light emitter to the LED light detector; and
a current source for supplying current to the sensor for level sensing and temperature sensing functions of a liquid within the tank;
wherein the LED light emitter and the LED light detector both have a construction including a material selected from the group consisting of GaAlAs, GaAS, and GaInAs and wherein the LED light emitter or the LED light detector is also a temperature sensor that interfaces with circuitry to determine a temperature of the liquid within the tank.

* * * * *